(12) United States Patent
Chen et al.

(10) Patent No.: US 12,510,474 B2
(45) Date of Patent: Dec. 30, 2025

(54) DETECTION DEVICE, DETECTION APPARATUS AND DETECTION METHOD

(71) Applicant: SKYVERSE TECHNOLOGY CO., LTD., Shenzhen (CN)

(72) Inventors: Lu Chen, Shenzhen (CN); Le Yang, Shenzhen (CN); Song Zhang, Shenzhen (CN)

(73) Assignee: SKYVERSE TECHNOLOGY CO., LTD., Guangdong (CN)

( * ) Notice: Subject to any disclaimer, the term of this patent is extended or adjusted under 35 U.S.C. 154(b) by 836 days.

(21) Appl. No.: 17/708,254

(22) Filed: Mar. 30, 2022

(65) Prior Publication Data
US 2022/0299438 A1    Sep. 22, 2022

(30) Foreign Application Priority Data
Mar. 31, 2021 (CN) .......................... 202120660053.1

(51) Int. Cl.
*G01N 21/47* (2006.01)
*G01N 21/95* (2006.01)

(52) U.S. Cl.
CPC ..... *G01N 21/4738* (2013.01); *G01N 21/9501* (2013.01); *G01N 2201/02* (2013.01);
(Continued)

(58) Field of Classification Search
CPC ........... G01N 21/4738; G01N 21/9501; G01N 2201/02; G01N 2201/061;
(Continued)

(56) References Cited

U.S. PATENT DOCUMENTS 7,507,957 B2    3/2009   Fujihira et al.
7,872,745 B2 *  1/2011   Abe .................. G01N 21/95607
                                                356/237.4
(Continued)

FOREIGN PATENT DOCUMENTS

CN    1668913 A    9/2005
CN    102498387 A  6/2012
(Continued)

OTHER PUBLICATIONS

Korean Patent Office Action for Application No. 20220040411 dated Jul. 16, 2024 (19 pages, including Statement of Relevance).

*Primary Examiner* — Tri T Ton
(74) *Attorney, Agent, or Firm* — Ming Jiang; OPENPTO US LLC (57) ABSTRACT

A detection device, a detection apparatus, and a detection method are provided. The detection device includes a detection assembly and a driving assembly. At least two rows of detection units are provided, and the detection units are arranged in a matrix along the first direction and the second direction. During detection, the driving assembly may drive one or both of the to-be-detected object and the detection assembly to move along at least one of the first direction and the second direction, so that the detection units scan different areas of the surface of the to-be-detected object, thereby realizing a scanning of the entire surface. That is, the scanning of the surface of the to-be-detected object is completed by using multiple detection units, which improves detection efficiency for the to-be-detected surface, and realizes a relatively high imaging quality.

13 Claims, 8 Drawing Sheets

(52) U.S. Cl.
CPC ............... *G01N 2201/061* (2013.01); *G01N 2201/0636* (2013.01); *G01N 2201/0833* (2013.01)

(58) Field of Classification Search
CPC ... G01N 2201/0636; G01N 2201/0833; G01N 2021/8816; G01N 2021/8835; G01N 2021/8845; G01N 2021/8854; G01N 2021/8861; G01N 21/01; G01N 21/8806; G01N 21/8851; G01N 21/95; G01N 2201/08; G01N 2201/101; G01N 2201/104
See application file for complete search history.

(56) References Cited

U.S. PATENT DOCUMENTS

| | | | | |
|---|---|---|---|---|
| 2007/0013903 | A1* | 1/2007 | Furman | G01N 21/95623 356/237.5 |
| 2011/0069154 | A1* | 3/2011 | Case | G01N 21/9501 348/46 |
| 2012/0326016 | A1* | 12/2012 | Ishizuka | G01D 5/34792 250/231.1 |
| 2016/0054237 | A1 | 2/2016 | Gerbelot | |

FOREIGN PATENT DOCUMENTS

| | | |
|---|---|---|
| CN | 106290390 A | 1/2017 |
| CN | 108917625 A | 11/2018 |
| CN | 110308152 A | 10/2019 |
| CN | 110319311 A | 10/2019 |
| CN | 111785657 A | 10/2020 |
| CN | 111855662 A | 10/2020 |
| JP | 2005525551 A | 8/2005 |
| KR | 100911330 B1 | 8/2009 |
| KR | 20120027702 A | 3/2012 |
| KR | 20120084738 A | 7/2012 |
| KR | 20180124087 A | 11/2018 |
| TW | 201024724 A | 7/2010 |
| TW | 201901141 A | 1/2019 |

* cited by examiner

S1 — At least two rows of detection units are arranged, wherein the detection units in different rows are arranged along a first direction in a field of view on a surface of a to-be-detected object, the detection units in the same row are arranged along a second direction in the field of view on the surface of the to-be-detected object, each row of detection units comprises at least two detection units, and the second direction is perpendicular to the first direction S2 — The to-be-detected object is driven to move along at least one of the first direction and the second direction, or the detection units are driven as a whole to move along at least one of the first direction and the second direction, to detect the surface of the to-be-detected object

DETECTION DEVICE, DETECTION APPARATUS AND DETECTION METHOD

CROSS-REFERENCE TO RELATED APPLICATIONS

This application claims priority to Chinese Application No. 202110352735.0, filed on Mar. 31, 2021 and Chinese Application No. 202120660053.1, filed on Mar. 31, 2021, with the China National Intellectual Property Administration, both of which are hereby incorporated by reference in their entireties.

TECHNICAL FIELD

The present disclosure relates to the technical field of optical detection, in particular to a detection device, a detection apparatus and a detection method.

BACKGROUND OF THE INVENTION

A conventional method for detecting a surface quality of a semiconductor wafer is performed by an optical detection device. The optical detection device usually includes a light source and an objective lens. The light source is used to illuminate a part of a to-be-detected wafer. Light reflected by the wafer is transmitted to some components such as a camera through the objective lens, to obtain an image of the part of the wafer. The obtained image is used to analyze a quality of the part of the wafer. The entire area of the wafer may be detected by moving the wafer or moving the optical detection device.

In a detection process for the wafer, a problem concerned by those skilled in the art is to improve a speed of detection.

SUMMARY OF THE INVENTION

An objective of the present disclosure is to provide a detection device, a detection apparatus and a detection method, with which a detection speed can be improved.

In a first aspect, a detection device is provided according to the present disclosure. The detection device includes a detection assembly and a driving assembly. The detection assembly includes at least two rows of detection units. The rows of detection units are arranged along a first direction in a field of view on a surface of a to-be-detected object, and each row of detection units comprises at least two detection units, the detection units in one row are arranged along a second direction in the field of view on the surface of the to-be-detected object, and each of the detection units is configured to detect the to-be-detected object, where the second direction is perpendicular to the first direction.

The driving assembly is configured to drive the to-be-detected object to move along at least one of the first direction and the second direction, or drive the detection assembly as a whole to move along at least one of the first direction and the second direction.

In an embodiment, each of the detection units includes an optical path assembly and a detection component. The optical path assembly is configured to direct light emitted from a light source to a detection area on the surface of the to-be-detected object, and direct signal light formed by the detection area to the detection component.

The detection component is configured to detect the detection area based on the signal light. In a detection process, scanning ranges of the detection units are at least partially non-overlapping.

In an embodiment, fields of view of optical path assemblies in adjacent rows are spaced by a same distance of L/N, and the number of the fields of view in each of the rows is M. The fields of view of optical path assemblies in the same row are spaced by a distance of S/M, where L represents a maximum dimension of the surface of the to-be-detected object along the first direction, and S represents a maximum dimension of the surface of the to-be-detected object along the second direction, and N is the number of rows of the detection units.

In an embodiment, each of the detection components includes a tube lens and a detector. The tube lens is configured to direct the signal light to the detector.

Optical axes of the detection components are parallel to the surface of the to-be-detected object, and the optical axes of the detection components are in the same horizontal plane.

Alternatively, optical axes of a part of the detection components are parallel to the surface of the to-be-detected object, and the optical axes of the part of the detection components are in the same horizontal plane, and optical axis of other part of the detection components are perpendicular to the surface of the to-be-detected object.

In an embodiment, each of the optical path assemblies is connected to the light source through an optical fiber.

An optical axis of the optical path assembly is perpendicular to the surface of the to-be-detected object. The optical path assembly includes a beam splitter and an objective lens. The beam splitter is configured to transmit light emitted from the light source to the objective lens. The objective lens is configured to collect the signal light returned by the surface of the to-be-detected object, and transmit the signal light to the beam splitter. The beam splitter is further configured to reflect the signal light collected by the objective lens to the detection component.

In an embodiment, the optical path component further includes a collimating assembly and a filter assembly. The collimating assembly is connected with the light source, and is configured to collimate the light emitted from the light source. The light collimated by the collimating assembly is received by the beam splitter. The filter assembly is arranged on the optical path between the light source and the objective lens, where the filter assembly includes one or more diaphragms.

In an embodiment, each of the optical path assemblies is connected to the light source through an optical fiber.

Each of the optical path assemblies includes a beam splitter and an objective lens. An optical axis of the optical path assembly between the light source and the beam splitter is parallel to the surface of the to-be-detected object. The beam splitter is configured to reflect the light emitted from the light source to the objective lens. The objective lens is configured to collect the signal light returned from the surface of the to-be-detected object, and transmit the signal light to the beam splitter. The detection component includes a first detection component and a second detection component. The second detection component has an optical axis perpendicular to the surface of the to-be-detected object. The first detection component includes a reflector. The beam splitter is further configured to transmit the signal light collected by the objective lens to the second detection component, or to transmit the signal light collected by the objective lens to the reflector. The reflector is configured to reflect the signal light transmitted through the beam splitter to rotate a propagation direction of the signal light by 90°, and direct the reflected signal light to the first detection component.

In an embodiment, the field of view of the first detection component is spaced from the field of view of the second detection component.

In an embodiment, the driving assembly includes a first driving component configured to drive the to-be-detected object to move along the first direction and the second direction with respect to the detection units. During operation, the first driving component drives the to-be-detected object to reciprocate along the first direction, where a travel distance of one way in reciprocating is greater than or equal to one row spacing, the row spacing indicates a distance between adjacent rows; and every time before the to-be-detected object is driven to change direction, the first driving component drives the to-be-detected object to move along the second direction with a predetermined distance, where the predetermined distance is greater than or equal to an interval between adjacent detection units along the second direction.

In an embodiment, the detective device further includes an autofocus module fixedly arranged on each of the detection components, where the autofocus module is configured to make the detection unit focus on the to-be-detected object, and the autofocus module comprises one or both of a WDI module and a spectral confocal module.

Alternatively, the detective device further includes a low-power imaging assembly, wherein an optical axis of a lens of the low-power imaging assembly is arranged at a center of an area enclosed by light exit ports of the optical path assemblies.

Alternatively, each of the detection components includes a camera, a zoom motor, and an imaging zoom lens barrel, wherein the zoom motor is configured to drive the imaging zoom lens barrel to move along an axial direction of the imaging zoom lens barrel to achieve zooming of the camera.

Alternatively, each of the optical path assemblies includes a light incident end connected to an optical fiber, and the optical path assembly is further provided with at least one diaphragm, a beam splitter and an objective lens, where the optical axis of the light incident end is perpendicular to the surface of the to-be-detected object or is parallel to the surface of the to-be-detected object.

In an embodiment, the objective lens of the optical path assembly has an aperture size in a range from 10 mm to 150 mm, and the objective lens has a numerical aperture in a range from 0.1 to 0.95.

In an embodiment, the detection device further comprises a rack, and the detection units are integrated on the rack.

In a second aspect, a detection method is provided according to the present disclosure. The detection method includes: arranging at least two rows of detection units in advance, wherein the rows of detection units are arranged along a first direction in a field of view on a surface of a to-be-detected object, the detection units in one row are arranged along a second direction in the field of view on the surface of the to-be-detected object, each row of detection units comprises at least two detection units, and the second direction is perpendicular to the first direction; and driving the to-be-detected object to move along at least one of the first direction and the second direction, or driving the detection units as a whole to move along at least one of the first direction and the second direction, to detect the surface of the to-be-detected object.

In an embodiment, the driving the to-be-detected object comprises: driving the surface of the to-be-detected object to move along the first direction and the second direction with respect to the detection units; during operation, driving the to-be-detected object to reciprocate along the first direction, where a travel distance of one way in reciprocating is greater than or equal to one row spacing and the row spacing indicates a distance between adjacent rows; and driving, every time before the to-be-detected object is driven to change direction, the to-be-detected object to move along the second direction with a predetermined distance, wherein the predetermined distance is greater than or equal to an interval between adjacent detection units along the second direction.

In a third aspect, a detection apparatus is provided according to the present disclosure. The detection apparatus includes an installation body. The installation body is provided with at least two detection devices. Each of the detection devices includes a positioning device configured to support the to-be-detected object, and at least one detection unit. The detection unit is configured to transmit light with a predetermined wavelength to a surface of the to-be-detected object supported by a corresponding positioning device, to detect the surface. Predetermined wavelengths of light transmitted through different detection devices have at least partially non-overlapping ranges.

Reference numerals shown in FIG. 1 to FIG. 8B are explained as follows.

10 Optical path assembly;
11 Light incident end;
12 Pupil;
13 Beam splitter;
14 Objective lens;
10a Light exit port;
20 Detection component;
21 Camera;
22 Zoom motor;
23 Imaging zoom lens barrel;
24 Camera fixing frame;
20' First detection component;
20" Second detection component;
25 Reflector;
30 Fiber;
40 Autofocus module;
50 Rack;

60 Low-power imaging assembly;
70 Wafer;
71 First wafer;
72 Second wafer;
80 Installation body;
81 First accommodating chamber;
82 Second accommodating chamber.

DETAILED DESCRIPTION OF THE INVENTION

A conventional device for detecting a quality of a wafer usually includes a lens assembly. An entire surface of the wafer is detected by continuously changing a position of the lens assembly relative to the wafer. A detection efficiency of such method depends totally on a changing speed of the relative position between the lens assembly and the wafer. However, a fast relative movement speed may lead to a low detection quality.

In view of this, a detection device is provided according to embodiment of the present disclosure, which takes into account both detection efficiency and a detection quality.

In order to make those skilled in the art better understand technical solutions of the present disclosure, the present disclosure is described in further detail below with reference to the accompanying drawings and specific embodiments.

Figure 1:
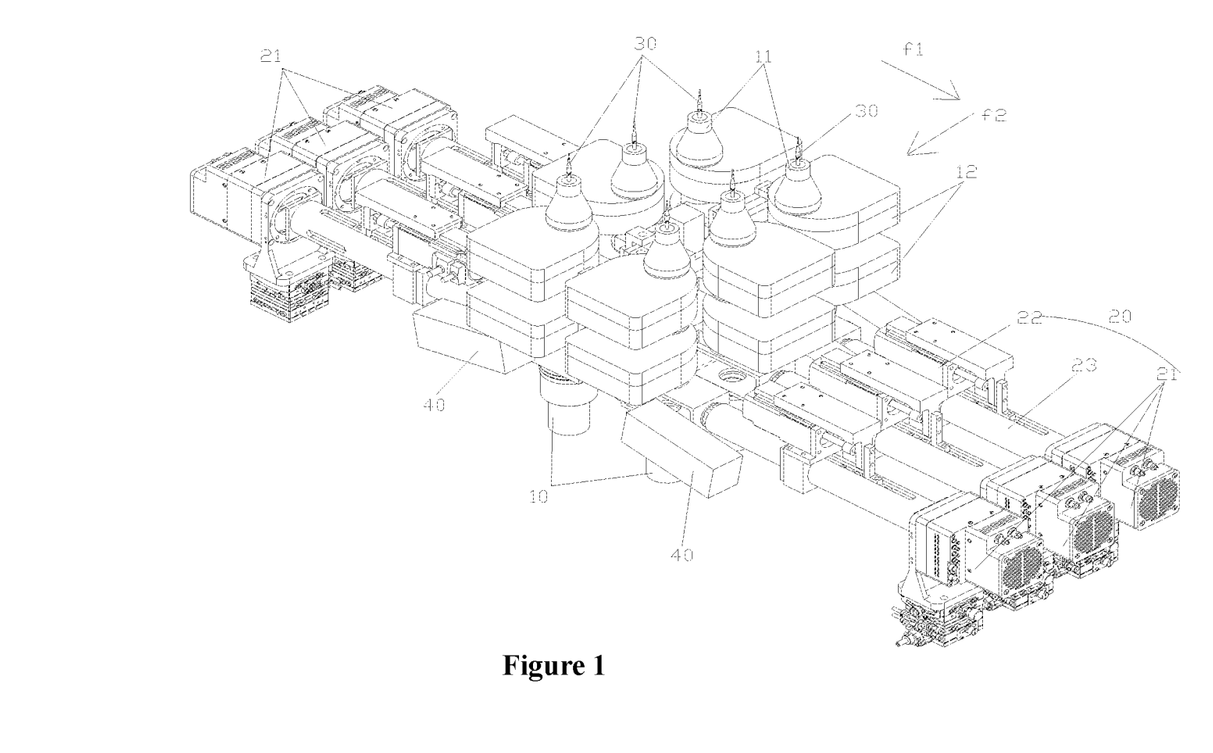
FIG. 1 is a schematic diagram of a three-dimensional structural of a detection device according to an embodiment of the present disclosure.
Figure 2:
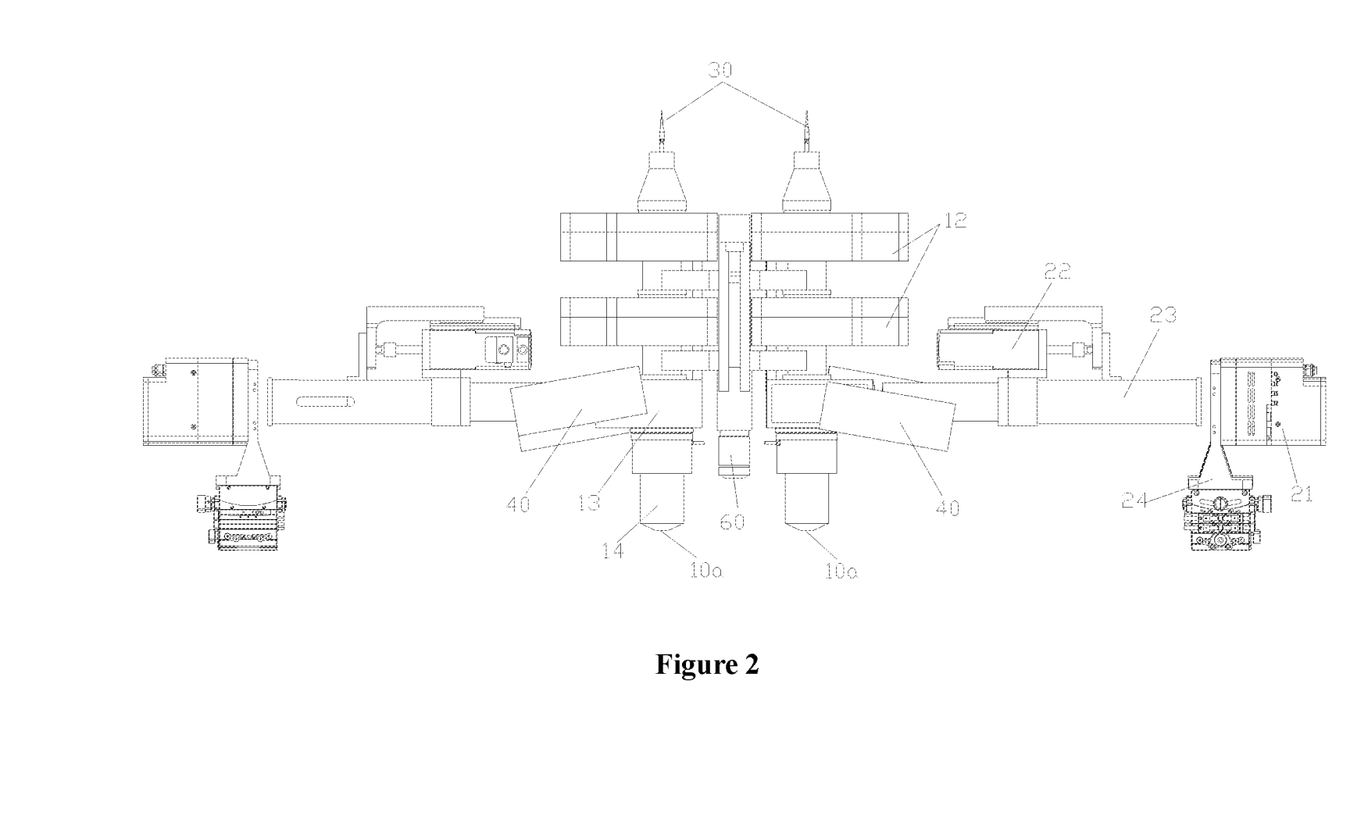
FIG. 2 is a schematic front view of the detection device shown in FIG. 1.
Figure 3:
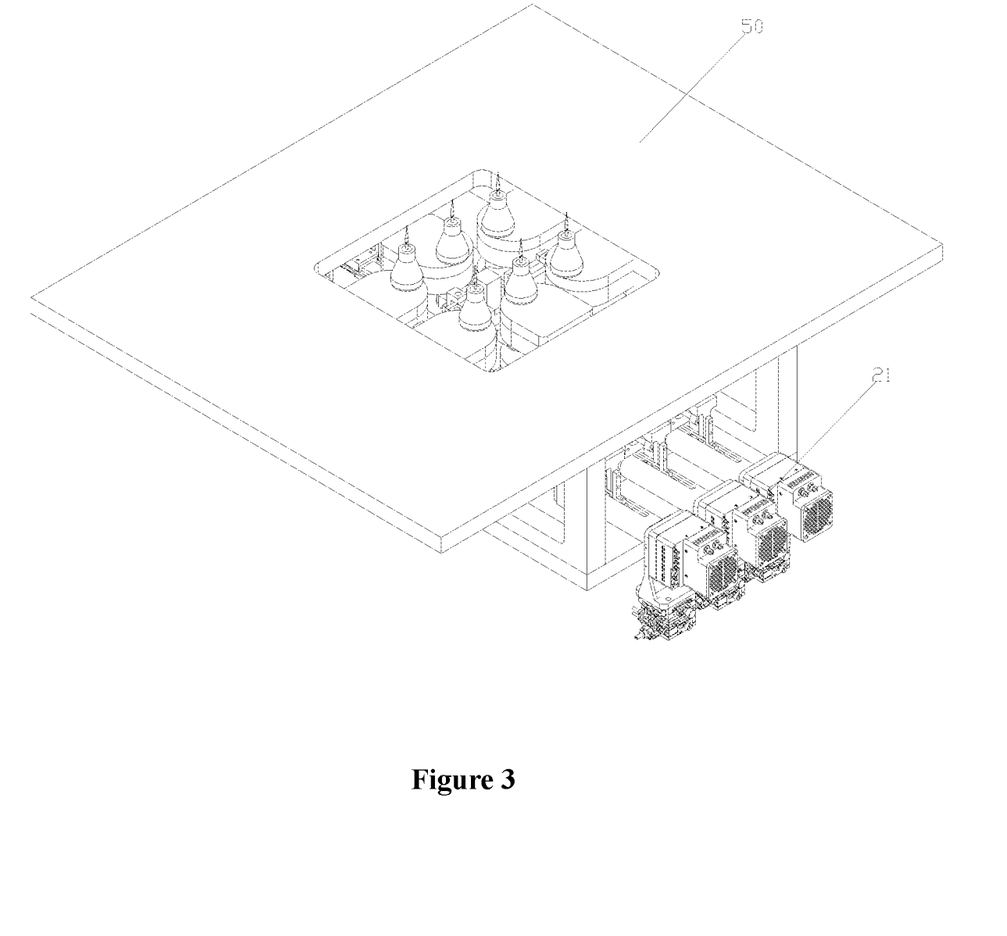
FIG. 3 is a schematic structural diagram of a detection device according to another embodiment of the present disclosure.
Figure 4:
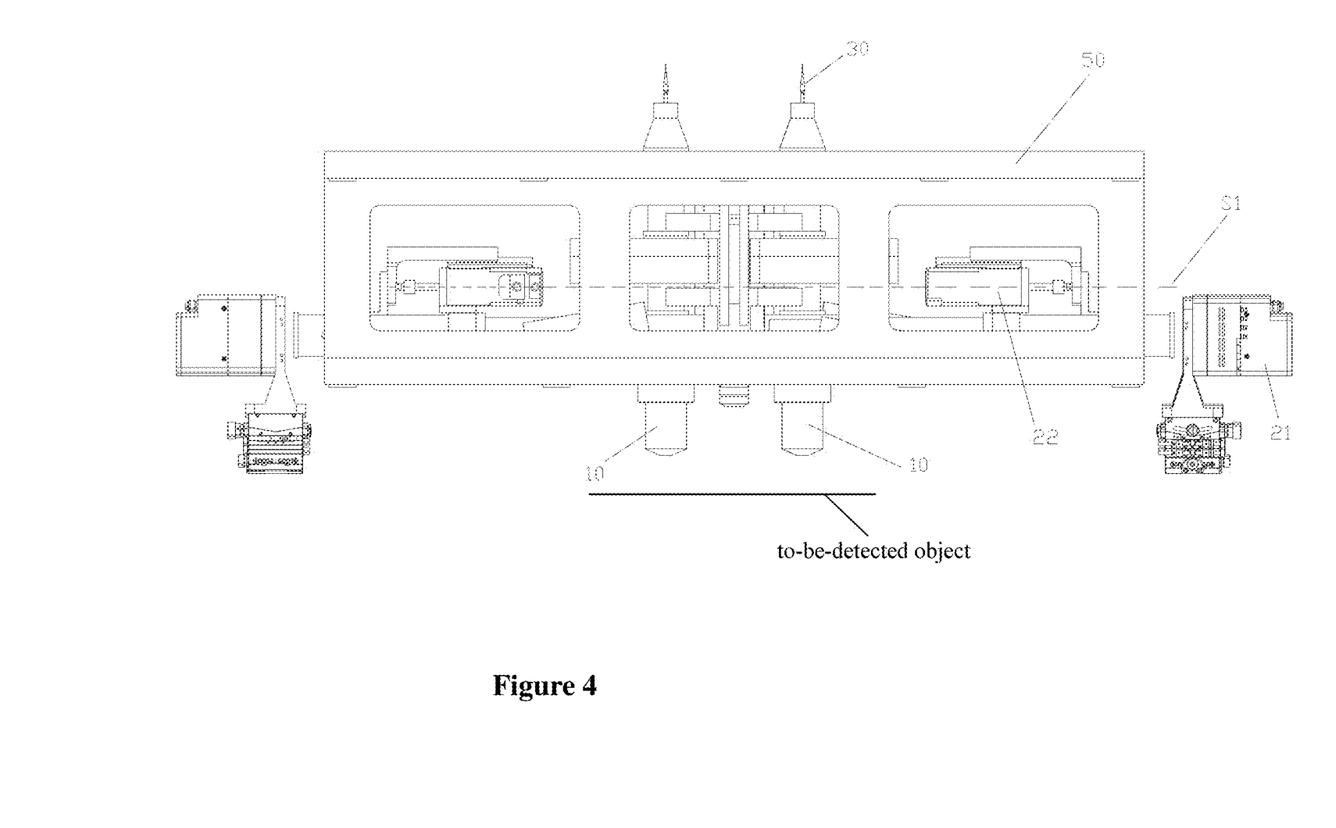
FIG. 4 is a view of the detection device shown in FIG. 3 in another direction.
Figure 5:
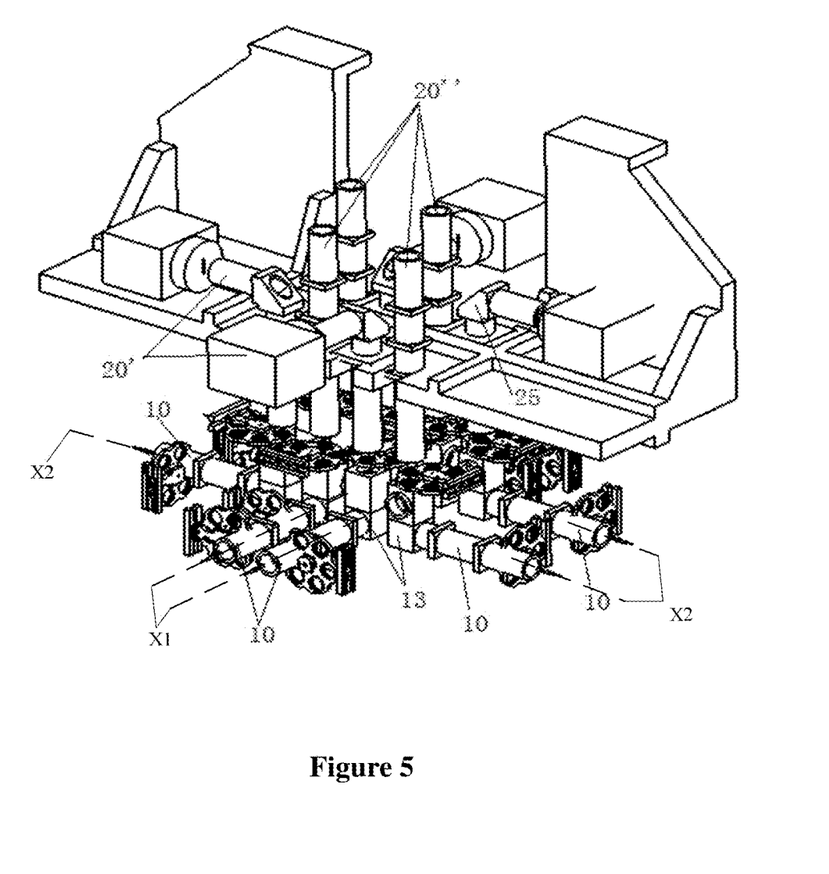
FIG. 5 is a three-dimensional schematic diagram of a detection device according to another embodiment of the present disclosure.
Figure 6:
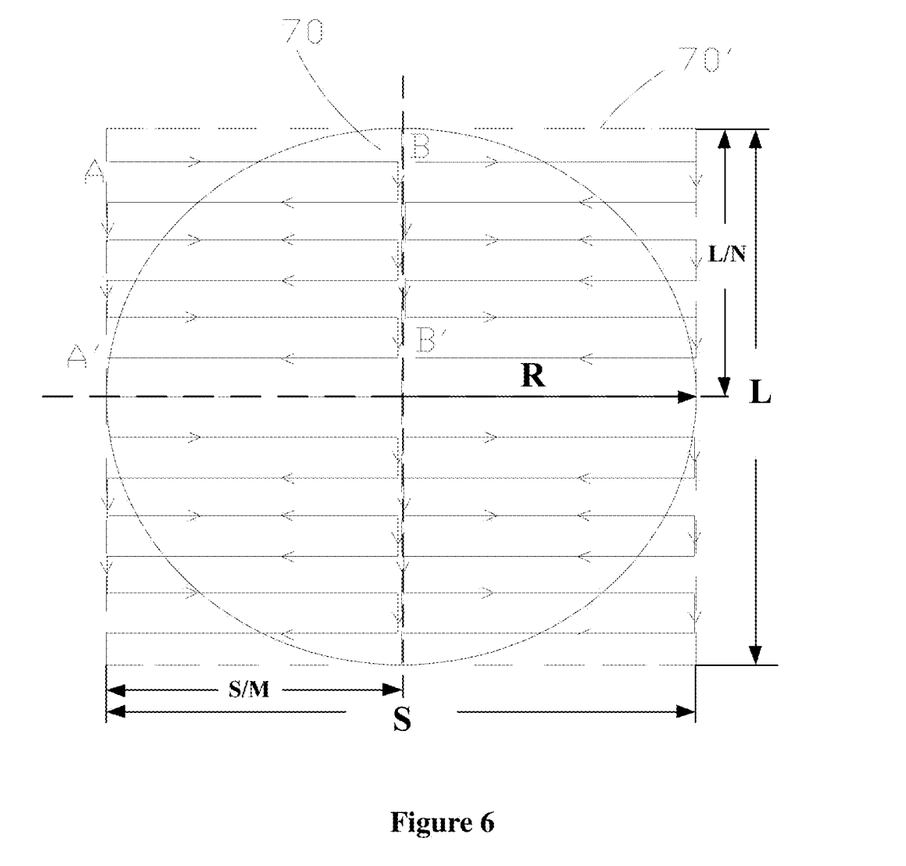
FIG. 6 is a schematic diagram of a scanning trajectory for detection units according to an embodiment of the present disclosure.

Reference is made to FIG. 1 to FIG. 6, where FIG. 1 is a schematic diagram of a three-dimensional structural of a detection device according to an embodiment of the present disclosure; FIG. 2 is a schematic front view of the detection device shown in FIG. 1; FIG. 3 is a schematic structural diagram of a detection device according to another embodiment of the present disclosure; FIG. 4 is a view of the detection device shown in FIG. 3 in another direction; FIG. 5 is a three-dimensional schematic diagram of a detection device according to another embodiment of the present disclosure; and FIG. 6 is a schematic diagram of a scanning trajectory for detection units according to an embodiment of the present disclosure.

In the present disclosure, a detection device includes a detection assembly and a driving assembly. The detection assembly includes at least two rows of detection units. The rows of detection units are arranged along a first direction in a field of view on a surface of a to-be-detected object. Each row of detection units includes at least two detection units. The detection units in the same row are arranged along a second direction in the field of view on the surface of the to-be-detected object. In other words, the detection assembly includes at least four detection units. Each of the detection units is configured to detect the to-be-detected object. The second direction is perpendicular to the first direction.

In an embodiment of the present disclosure, the driving assembly is configured to drive the to-be-detected object to move along at least one of the first direction and the second direction, or drive the detection assembly as a whole to move along at least one of the first direction and the second direction. Although the driving assembly is not shown in the drawings, those skilled in the art can understand and implement the technical solutions in the present disclosure.

The driving assembly can drive at least one of the to-be-detected object and the detection assembly to move along the first direction and/or the second direction, so as to detect an entire surface of the to-be-detected object.

In the present disclosure, at least two rows of detection units are provided, and the detection units are arranged in a matrix along the first direction and the second direction. During detection, the driving assembly may drive at least one of the to-be-detected object and the detection assembly to move along at least one of the first direction and the second direction. In this way, the detection units scan different areas of the surface of the to-be-detected object, thereby realizing a scanning of the entire surface. That is, the scanning of the surface of the to-be-detected object in the present disclosure is completed by using multiple detection units. Compared with only one optical path assembly for scanning a to-be-detected surface, the device provided in embodiments of the present disclosure scans different areas of the surface of the to-be-detected object simultaneously using at least four detection units, which improves detection efficiency for the to-be-detected surface and realizes a relatively high imaging quality.

In a specific implementation, each of the detection units includes an optical path assembly 10 and a detection component 20.

The optical path assembly 10 directs light from a light source to a detection area on the surface of the to-be-detected object, and directs a signal light formed by the detection area to the detection component 20. The optical path assembly 10 may include at least one diaphragm, where the number and type of diaphragms may be determined based on an actual application requirement, as long as the optical path can be configured to meet the requirement. The diaphragm may be fixed by using a pupil 12. An objective lens of the optical path assembly 10 facing the detection area on the surface of the to-be-detected object is a high-power lens with a magnification factor of 10 times to 300 times, so that the detection area may be magnified to a large times, which is conducive to obtaining an image of a small area.

The optical path assembly 10 may further include other components, such as a filter. The detection component 20 detects the detection area according to the signal light. For example, the detection component 20 obtains an image of the detection area based on reflected light transmitted through the optical path assembly 10, so as to facilitate subsequent analysis of the image and determination of surface quality of the detection area.

It should be noted that the field of view described herein indicates an area of the surface of the to-be-detected object that can be simultaneously detected by detection devices, more specifically, indicates an area illuminated by light from the light source and capable of being imaged using reflected light. That is, the field of view is an overlapping area of a light spot formed by the light from the light source and an image of an imaging surface of the detection component 20 on the surface of the to-be-detected object. The light spot formed by the light from the light source is larger than the image of the imaging surface of the detection component 20 on the surface of the to-be-detected object. Therefore, the field of view is the area of the image of the imaging surface of the detection component on the surface of the to-be-detected object.

In a detection process of the detection device according to the present disclosure, scanning ranges of the detection units are at least partially non-overlapping. In an embodiment of the present disclosure, the scanning ranges of the detection units do not overlap at least partially with each other. That is, scanning areas of the detection units are not all the same. In this way, the entire surface of the to-be-detected surface may be scanned by the detection units scanning different areas of a detection surface. In other words, in the present disclosure, the scanning of the to-be-detected surface is completed by the optical path assemblies 10 of the respective detection units. In a specific implementation, light exit ports 10a of the optical path assemblies 10 of the respective detection units are arranged on the same side of the surface of the to-be-detected object, and are arranged in multiple rows along the first direction, and at least two light exit ports 10a are arranged in each row at an interval. In an embodiment, and adjacent light exit openings 10a in each row may be spaced at the same distance. The first direction is shown as f1 in FIG. 1, and the second direction f2 is perpendicular to the first direction f1. In this specification, the technical solutions and technical effects are described by taking an arrangement of two rows of light exit ports 10a along the first direction as an example.

In the above embodiments, the light exit ports 10a of the optical path assemblies 10 are arranged in a matrix, so that the scanning area of each of the light exit ports 10a may be simply equivalent to a rectangular area. Especially when adjacent light exit ports 10a in the same row are spaced with the same distance, the scanning areas of the light exit ports 10a may be approximately the same rectangle respectively, which is conducive to simplifying movement of the surface of the to-be-detected object or movement of the detection units, so as to scan the entire to-be-detected surface through a simple movement.

In this specification, description is made with an example in which the to-be-detected object is a wafer 70, and a specific scanning trajectory for the light exit ports 10a in two rows of optical path assemblies 10 is provided as shown in FIG. 6.

In the above embodiments, the signal light reflected by the detection area passes through the light exit port 10a and then enters the detection component 20.

In another embodiment, the fields of view of optical path assemblies in adjacent two rows are spaced by the same distance of L/N, and the number of the fields of view in each of the rows is M. The fields of view of optical path assemblies in the same row are spaced by a distance of S/M. In the description, L represents a maximum dimension of the surface of the to-be-detected object along the first direction; S represents a maximum dimension of the surface of the to-be-detected object along a direction perpendicular to the first direction; and N represents the number of rows, which may be a natural number such as 3 or more. A value of N may be determined based on a size of the surface of the to-be-detected object.

That is, all the light exit ports form an N*M matrix.

Taking the wafer 70 as an example, both L and S are equal to 2R, where R represents a radius of the wafer 70. For an arrangement of two rows of detection units, the distance between the fields of view of the two rows is equal to R. When each row includes three detection units, the distance between adjacent fields of view in one row is equal to 2R/3. That is, the fields of view form a 2*3 matrix. When the wafer 70 moves along the first direction f1 and the second direction f2, an integral scanning area of the fields of view is a square 70' circumscribed to the wafer 70, and the scanning area of each of the fields of view is ⅙ of the area of the square 70'.

Correspondingly, if the detection units are arranged in a 2*2 matrix in the above manner, the scanning area of each of the fields of view is ¼ of the area of the square 70'. FIG. 6 shows a scanning trajectory for four fields of view, in which only two fields of view are identified each with a start point and an end point. For the field of view on the upper left, a movement starts from A and ends at A', realizing a detection of a quarter of the square area. For the field of view on the upper right, the movement starts from B and ends at B', realizing the detection of another quarter of the square area. Same principles apply to the movement trajectories of the other fields of view.

It should be noted that the distance between the fields of view described herein indicates a distance between center positions of two fields of view.

In an embodiment, the detection device may further include a first driving component (not shown in the figure) configured to drive the to-be-detected object to move along the first direction f1 and the second direction f2 with respect to the detection units. During operation, the first driving component drives the to-be-detected object to reciprocate along the first direction f1 and a travel distance of one way in reciprocating is greater than or equal to one row spacing. The row spacing indicates a distance between adjacent rows. Every time before the to-be-detected object is driven to change direction, the first driving component drives the to-be-detected object to move along the second direction f2 with a predetermined distance, where the predetermined distance is greater than or equal to a distance between adjacent detection units along the second direction f2.

That is, the first driving component drives the surface of the to-be-detected object to move along an S-shaped track on a plane. Such movement can effectively cover the entire surface of the to-be-detected object and avoid misdetection. An embodiment in which the travel length in the first direction f1 is approximately equal to the row spacing is shown in FIG. 6.

For the detection of the wafer 70, the detection devices in the above-mentioned embodiments are usually installed inside an equipment chamber. Thus, there are certain requirements for the height of the detection device. In order to reduce the height of the detection device as much as possible, the following arrangements are provided.

In an embodiment, each of the detection components 20 includes a tube lens and a detector. The tube lens is configured to direct the signal light to the detector. In an embodiment, the tube lens shown herein is an imaging zoom lens barrel 23 as shown in FIGS. 1 and 2, which may be other components having the same function. Optical axes of the respective detection components 20 are parallel to the surface of the to-be-detected object, and the optical axes are in the same horizontal plane.

An optical axis of the detection component 20 refers to a central axis of a light beam propagating in the detection component 20, or a central axis of a light beam reaching the detection component 20. The same applies to optical axes of other components.

The detection component 20 may be a camera 21. The optical axis S1 of the lens of each camera 21 is parallel to the surface of the to-be-detected object. That is, the optical axis S1 of the camera 21 is parallel to the surface of the wafer 70. The optical axes S1 of all the cameras are in the same horizontal plane. The arrangement of the cameras 21 in the same horizontal plane may effectively reduce an overall height of the device.

When many detection components need to be installed and the horizontal arrangement of the optical axes of the detection components cannot meet the requirement, the following settings may also be adopted if the device has an enough height.

In another embodiment, the optical axes of a part of the detection components 20 are parallel to the surface of the to-be-detected object, and the optical axes of the part of the detection components are in the same horizontal plane. The optical axes of the other part of the detection components 20 are perpendicular to the surface of the to-be-detected object.

For example, when each of the detection components 20 includes a camera 21, the optical axes of lenses of a part of the cameras 21 are parallel to the surface of the to-bedetected object, and the optical axes of the part of the cameras 21 are in the same horizontal plane. The optical axes of lenses of the other part of the cameras 21 are perpendicular to the surface of the to-be-detected object. That is, the optical axes of a part of the cameras 21 are perpendicular to the optical axes of the other part of cameras. That is, the optical axes of the part of the cameras 21 are arranged horizontally, and the optical axes of the other part of the cameras 21 are arranged vertically, so as to realize a flexible arrangement of a device.

The camera 21 may be further fixed by a camera fixing frame 24.

For clear imaging, the detection device may further include an autofocus module 40. The autofocus module 40 may include one or both of a WDI module and a spectral confocal module. A specific structure and working principle of the WDI module and the spectral confocal module are well-known according to the conventional technology, which is not repeated herein.

Referring to FIG. 1, in an embodiment, the optical path assembly 10 is connected to the light source through an optical fiber. The optical axis of the optical path assembly 10 is perpendicular to the surface of the to-be-detected object. The optical path assembly includes a beam splitter 13 and an objective lens 14. The beam splitter 13 is configured to transmit the light from the light source to the objective lens 14. The objective lens 13 is configured to collect the signal light returned from the surface of the to-be-detected object, and transmit the signal light to the beam splitter 13. The beam splitter 13 is further configured to reflect the signal light collected by the objective lens to the detection component 20.

It should be noted that the optical axis X1 and X2 of the optical path assembly 10 indicates a central axis of a light beam propagating in the optical path assembly.

In another embodiment, the optical path assembly 10 is connected to the light source through an optical fiber.

The optical path assembly 10 includes a beam splitter 13 and an objective lens 14. An optical axis of the optical path assembly 10 between the light source and the beam splitter 13 is parallel to the surface of the to-be-detected object. The beam splitter is configured to reflect the light emitted from the light source to the objective lens 14. The objective lens 14 is configured to collect the signal light returned from the surface of the to-be-detected object, and transmit the signal light to the beam splitter 13. The detection component includes a first detection component 20' and a second detection component 20''. The second detection component 20'' has an optical axis perpendicular to the surface of the to-be-detected object. The first detection component 20' includes a reflector 25. The beam splitter 13 is further configured to transmit the signal light collected by the objective lens to the second detection component 20'', or is further configured to transmit the signal light collected by the objective lens to the reflector. The reflector 25 is configured to reflect the signal light transmitted through the beam splitter to rotate a propagation direction of the signal light by 90° and direct the reflected signal light to the first detection component 20'.

Further, the field of view of the first detection component 20' is spaced from the field of view of the second detection component 20''.

The first detection component 20' may be arranged horizontally, and the second detection part 20'' may be arranged vertically. The optical axes of first detection components 20' may all be located on the same horizontal plane, and second detection components 20'' may all be arranged at the same height.

In another embodiment, the optical path assembly further includes a collimating assembly and a filter assembly. The collimating assembly is connected with the light source, and is configured to collimate the light emitted from the light source. The light collimated by the collimating assembly is received by the beam splitter. The filter assembly is arranged on the optical path between the light source and the objective lens, and includes one or more diaphragms.

In addition, each of the detection devices may further include a low-power imaging assembly configured to observe a low-power image of the wafer, locate the wafer position, and the like. The magnification factor of the low-power imaging assembly is 1 to 10 times. The optical axis of the lens of the low-power imaging assembly is arranged at a center of an area enclosed by the light exit ports of the optical path assemblies 10. The low-power imaging assembly 60 also includes an optical path assembly and a detection component. The optical path assembly of the low-power imaging assembly 60 is connected with the light source and has the same function as the optical path assembly of the detection unit, except that the lens of the optical path assembly of the low-power imaging assembly 60 is a low-power lens and may obtain a larger viewing. Similarly, the detection component of the low-power imaging assembly 60 has the same function as the detection component of the detection unit, and the structures thereof may be the same or different.

The low-power imaging component is provided to observe the surface of the to-be-detected object from a macroscopic level, in order to realize functions such as defect positioning.

In addition to the camera, the detection component 20 may further include a zoom motor 22 and an imaging zoom lens barrel 23. The zoom motor 22 is configured to drive the imaging zoom lens barrel 23 to move along an axial direction of the imaging zoom lens barrel to realize zooming of the camera 21, so as to improve imaging resolution of the camera 21.

Each of the optical path assembly 10 may include a light incident end 11 connected to the optical fiber 30. In addition to the above-mentioned at least one diaphragm, the optical path assembly 10 may further include a beam splitter 13 and an objective lens 14. The reflected light passes through the objective lens 14 and the beam splitter 13, and then enters the detection component 20. The optical axis X1 of the light incident end 11 is perpendicular to the surface of the to-be-detected object, or the optical axis X2 of the light incident end 11 is parallel to the surface of the to-be-detected object. FIG. 2 shows that the optical axis of the light incident end 11 is perpendicular to the surface of the to-be-detected object. The diaphragm and the beam splitter 13 may be arranged reasonably such that the optical axis of the light incident end 11 is parallel to the surface of the to-be-detected object, that is, an incident light through the light incident end 11 is horizontal.

The objective lens 14 of the optical path assembly 10 has an aperture size in a range from 10 mm to 150 mm, and the objective lens 14 has a numerical aperture in a range from 0.1 to 0.95.

In the above embodiments, the detection device may further include a rack 50, and the detection units may be integrated on a rack 50. In this way, convenience of assemble and unassemble of the detection units is improved. A specific structure of the rack may be determined based on a specific structure of the components in the detection units. The rack may be supported on a body of adopted environmental equipment.

Figure 7:
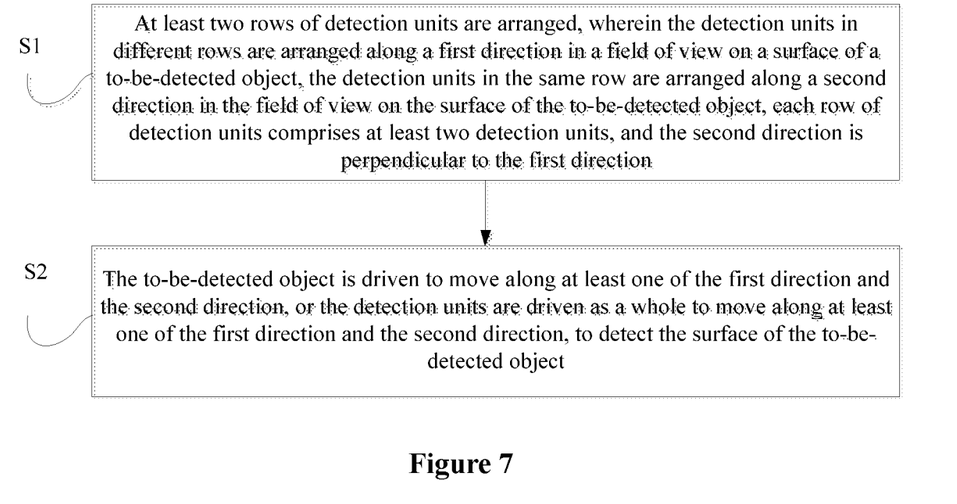
FIG. 7 is a flowchart of a detection method according to an embodiment of the present disclosure.

In addition, referring to FIG. 7, a detection method is further provided according to an embodiment of the present disclosure, the method includes steps S1 to S2.

In S1, at least two rows of detection units are arranged, wherein the detection units in different rows are arranged along a first direction in a field of view on a surface of a to-be-detected object, the detection units in the same row are arranged along a second direction in the field of view on the surface of the to-be-detected object, each row of detection units comprises at least two detection units, and the second direction is perpendicular to the first direction.

In S2, the to-be-detected object is driven to move along at least one of the first direction and the second direction, or the detection units are driven as a whole to move along at least one of the first direction and the second direction, to detect the surface of the to-be-detected object.

In an embodiment, the to-be-detected object may be driven by driving the to-be-detected object to move along the first direction and the second direction relative with respect to the detection units; during operation, driving the to-be-detected object to reciprocate along the first direction, where a travel distance of one way in reciprocating is greater than or equal to one row spacing and the row spacing indicates a distance between adjacent rows; and driving, every time before the to-be-detected object is driven to change direction, the to-be-detected object to move along the second direction with a predetermined distance, where the predetermined distance is greater than or equal to an interval between adjacent detection units along the second direction.

The detection method according to an embodiment of the present disclosure is performed based on the above-mentioned detection device, and therefore the detection method has the same technical effect as the detection device.

Figure 8A:
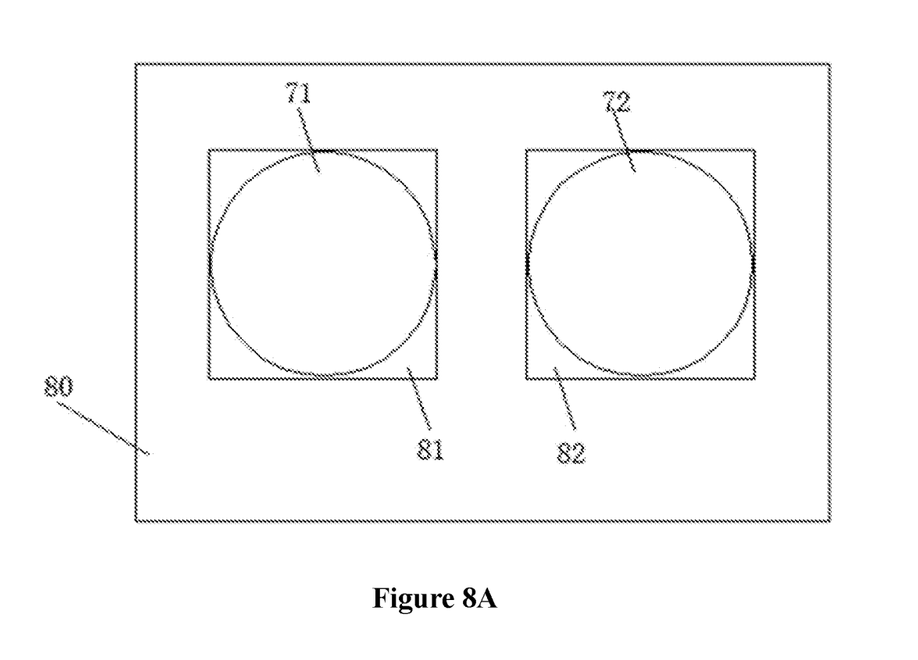
FIG. 8A is a schematic cross-sectional view of an installation body of a detection apparatus according to an embodiment of the present disclosure.
Figure 8B:
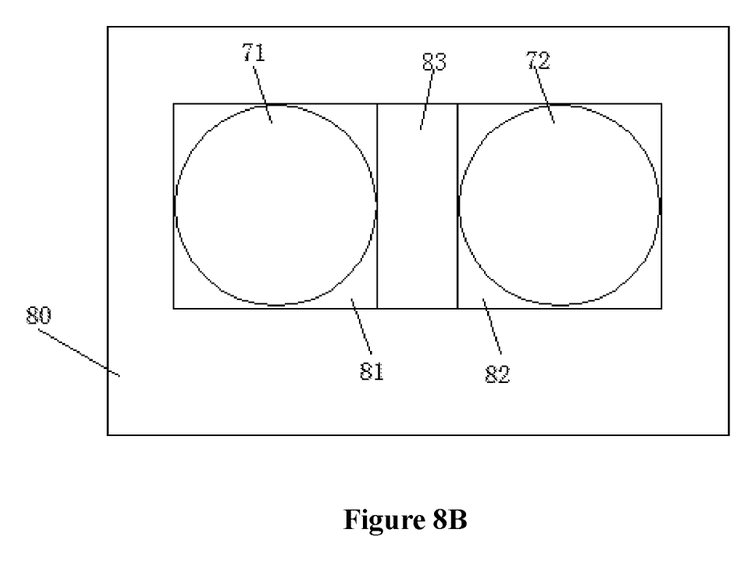
FIG. 8B is a schematic cross-sectional view of an installation body of a detection apparatus according to another embodiment of the present disclosure.

Each of FIG. 8A and FIG. 8B shows a schematic cross-sectional view of an installation body of the detection device according to an embodiment of the present disclosure. Referring to FIG. 8A and FIG. 8B, a detection apparatus is further provided according to an embodiment of the present disclosure. The detection apparatus includes an installation body 80. At least two detection devices are arranged on the installation body 80, and each of the detection devices includes a positioning device and at least one detection unit.

The positioning device is configured to support the to-be-detected object, and a structure of the positioning device may be the same as a conventional positioning device, which is not described in detail herein. Each of the detection units is configured to transmit light with a predetermined wavelength to a to-be-detected surface of the to-be-detected object supported by a corresponding positioning device, to detect the to-be-detected surface. Predetermined wavelengths of light transmitted through different detection devices have at least partially non-overlapping ranges. That is, wavelengths of the light of the detection devices are not exactly the same, which enables to detect different to-be-detected objects or different defects of a to-be-detected object.

When being detected, the to-be-detected object is supported by the positioning device of one detection device, and each of the detection units of the detection device is connected to a light source with a predetermined wavelength to detect a surface defect of the to-be-detected object. Since the installation body is provided with at least two detection devices, the detection apparatus according to the embodiment of the present disclosure can detect at least two to-be-detected objects. In addition, since the detection units in respective detection devices are connected to light sources with different wavelengths, different defect types of the to-be-detected object may be detected. In this way, a usage flexibility of the detection apparatus is improved, and thereby work efficiency is improved.

In an embodiment, each of the detection units includes an optical path assembly 10 and a detection component 20.

The optical path assembly 10 directs light from a light source to a detection area on the surface of the to-be-detected object, and directs a signal light formed by the detection area to the detection component 20. The optical path assembly 10 may include at least one diaphragm, where the number and type of diaphragms may be determined based on an actual application requirement, as long as the optical path can be configured to meet the requirement. The diaphragm may be fixed by using a pupil 12. An objective lens of the optical path assembly 10 facing the detection area on the surface of the to-be-detected object is a high-power lens with a magnification factor of 10 times to 300 times, so that the detection area may be magnified to a large times, which is conducive to obtaining an image of a small area.

The optical path assembly 10 may further include other components, such as a filter. The detection component 20 detects the detection area according to the signal light. For example, the detection component 20 obtains an image of the detection area based on reflected light transmitted through the optical path assembly 10, so as to facilitate subsequent analysis of the image and determination of surface quality of the detection area.

In an embodiment, the light incident ends 11 of all the optical path components of the same detection device are connected to one or more light sources with the same wavelength range.

In the embodiments, the light source connected to the optical path assembly of at least one of the detection devices is a single-wavelength light source; and the light source connected to the optical path assembly of at least one of the detection devices is a broad-spectrum light source.

In the embodiments, the number of the detection devices may be two. Light from the light source connected to the optical path assemblies 10 of one of the detection devices has a wavelength in a range from 266 nm to 355 nm, and light from the light source connected to the optical path assemblies 10 of the other detection device has a wavelength in a range from 355 nm to 532 nm. The respective detection devices are set with different wavelengths in order to detect different defects of the to-be-detected object.

In the embodiments, the detection apparatus further includes: a transport device configured to convey the to-be-detected object between different positioning devices. The to-be-detected object may be transferred between different positioning devices by the transport device. In this way, one to-be-detected object may be placed in the detection devices corresponding to light sources with different wavelengths, realizing detection of different defect types, which improves flexibility and efficiency of the detection of a to-be-detected object.

Referring further to FIG. 8B, in an embodiment, the detection device includes multiple accommodating chambers and multiple transport chambers 83. The detection devices are arranged within different accommodating chambers respectively. In an embodiment, one accommodating chamber may accommodate one detection device. The accommodating chamber is communicated with the transport chamber 83 through a transport window. The transport device is arranged within the transport chamber, and is configured to convey the to-be-detected object between adjacent accommodating chambers by means of the transport window. The multiple accommodating chambers indicate two or more the accommodating chambers. A size and shape of each of the accommodating chambers may be determined based on the to-be-detected object. FIG. 8B shows an embodiment including two accommodating chambers. The two accommodating chambers are a first accommodating chamber 81 and a second accommodating chamber 82. The first accommodating cavity 81 is communicated to the second accommodating chamber 82 via a transport chamber 83. The first accommodating chamber 81 and the second accommodating chamber 82 may be configured to perform quality defect detection on a first to-be-detected object 71 and a second to-be-detected object 72 respectively, or may be configured to detect the same to-be-detected object. The light source may be arranged outside the accommodating chambers and does not occupy any space within the accommodating chamber.

The light incident end 11 of each of the optical path assemblies 10 may be connected to a light source via an optical fiber. The optical fiber has a high flexibility and a fast transmission speed.

Specific implementations of the detection device formed by the detection units provided in the accommodating chambers are described below.

In an embodiment, each of the detection devices includes at least two rows of detection units. The detection units in different rows are arranged along a first direction f1 in a field of view of a surface of a to-be-detected object. Each row of detection units includes at least two detection units, and the detection units in the same row are arranged along a second direction f2 in the field of view on the surface of the to-be-detected object. In other words, the detection assembly includes at least four detection units. Each of the detection units is configured to detect the to-be-detected object. The second direction f2 is perpendicular to the first direction f1.

It should be noted that the field of view described herein indicates an area of the surface of the to-be-detected object that can be simultaneously detected by the detection apparatus, more specifically, indicates an area illuminated by the light from the light source and capable of be imaged using reflected light. That is, the field of view is an overlapping area of a light spot formed by the light from the light source and an image of an imaging surface of the detection component 20 on the surface of the to-be-detected object. The light spot formed by the light from the light source is larger than the image of the imaging surface of the detection component 20 on the surface of the to-be-detected object. Therefore, the field of view is the area of the image of the imaging surface of the detection component on the surface of the to-be-detected object.

The driving assembly according to an embodiment of the present disclosure is configured to drive the to-be-detected object to move along at least one of the first direction f1 and the second direction f2, or drive the entire detection assembly to move along at least one of the first direction f1 and the second direction f2. Although the driving assembly is not shown in the drawings, those skilled in the art can understand and implement the technical solutions in the present disclosure.

The driving assembly can drive at least one of the to-be-detected object and the detection assembly to move along the first direction f1 and/or the second direction f2, so as to detect an entire surface of the to-be-detected wafer.

In the present disclosure, at least two rows of detection units are arranged within an accommodating chamber. The detection units are arranged in a matrix along the first direction f1 and the second direction f2. During detection, the driving assembly may drive at least one of the to-be-detected object and the detection assembly along at least one of the first direction f1 and the second direction f2, so that the detection units scan different areas of a to-be-detected surface of the wafer, thereby realizing a scanning of the entire surface. That is, the scanning of the surface of the to-be-detected object in the present disclosure is completed by using multiple detection units. Compared with only one optical path assembly for scanning a to-be-detected surface, the detection device according to the embodiments of the present disclosure scans different areas of the surface of the to-be-detected object simultaneously using at least four detection units, which improves detection efficiency for the to-be-detected surface and realizes a relatively high imaging quality.

The detection units may be integrated on a rack 50. The rack 50 is fixedly connected within an accommodating chamber. The driving component is configured to drive the wafer to move along the first direction and the second direction, so as to detect the-to-be-detected surface of the wafer. In this way, the detection unit may be pre-formed as a whole by means of the rack 50, which is convenient for assemble and unassemble. The driving assembly drives a movement of the wafer, which is beneficial to simplify a mechanism and can be realized.

Although the driving assembly is not shown in the drawings, those skilled in the art can obviously know the functions and arrangement of the driving assembly based on the description herein.

In an embodiment, in each of the accommodating chambers, fields of view of optical path assemblies 10 in adjacent two rows are spaced by the same distance of L/N, and the number of the fields of view in each row is M. The fields of view of optical path assemblies in the same row are spaced by a distance of S/M. In the description, L represents a maximum dimension of a detection surface along the first direction; S represents a maximum dimension of the surface of the to-be-detected object along a direction perpendicular to the first direction; and N represents the number of rows. For the to-be-detected object having a circular surface, fields of view of optical path assemblies 10 in adjacent two rows are spaced by a distance of 2R/N, and the fields of view of optical path assemblies in the same row are spaced by a distance of 2R/M, where R represents a radius of the to-be-detected object, and N represents the number of rows.

That is, all the fields of view of the detection units form an N*M matrix.

For an arrangement of two rows of detection units, the distance between the fields of view of the two rows is equal to R. When each row includes three detection units, the distance between adjacent fields of view in one row is equal to 2R/3. That is, the fields of view form a 2*3 matrix. When the wafer 70 moves along the first direction f1 and the second direction f2, an integral scanning area of the fields of view is a square 70' circumscribed to the wafer 70, and the scanning area of each field of view is ⅙ of the area of the square 70'.

Correspondingly, if the detection units are arranged in a 2*2 matrix in the above manner, the scanning area of each of the fields of view is ¼ of the area of the square 70'. FIG. 6 shows a scanning trajectory for four fields of view, in which only two fields of view are identified each with a start point and an end point. For the field of view on the upper left, a movement starts from A and ends at A', realizing a detection of a quarter of the square area. For the field of view on the upper right, the movement starts from B and ends at B', realizing the detection of another quarter of the square area. Same principles apply to the movement trajectories of the other fields of view.

It should be noted that the distance between the fields of view described herein indicates a distance between center positions of two fields of view. The field of view mentioned herein indicates an area illuminated by the light from the light source and capable of being imaged using a reflected light.

The detection areas of the fields of view of the detection units may be at least partially non-overlapping, so as to achieve rapid detection of a to-be-detected surface of a wafer.

During operation, the first driving component drives the to-be-detected object to reciprocate along the first direction f1 and a travel distance of one way in reciprocating is greater than or equal to one row spacing. The row spacing indicates a distance between adjacent rows. Every time before the to-be-detected object is driven to change direction, the first driving component drives the to-be-detected object to move along the second direction f2 with a predetermined distance, where the predetermined distance is greater than or equal to a distance between adjacent detection units along the second direction f2.

That is, the first driving component drives the surface of the to-be-detected object to move along an S-shaped track on a plane. Such movement can effectively cover the entire surface of the to-be-detected object and avoid misdetection. An embodiment in which the travel length in the first direction f1 is approximately equal to the row spacing is shown in FIG. 6.

In an embodiment, optical axes of the respective detection components 20 are parallel to the surface of the to-be-detected object, and the optical axes are located in the same horizontal plane.

The detection component 20 may be a camera 21. The optical axis S1 of the lens of the camera 21 is parallel to the surface of the to-be-detected object. That is, the optical axis S1 of the camera 21 is parallel to the surface of the wafer 70. The optical axes S1 of all the cameras are in the same horizontal plane. The arrangement of the cameras 21 in the same horizontal plane may effectively reduce an overall height of the device.

When many detection components needs to be installed and the horizontal arrangement of the optical axes of the detection components cannot meet the requirement, the following settings may also be adopted if the device has an enough height.

In another embodiment, the optical axes of a part of the detection components 20 are parallel to the surface of the to-be-detected object, and the optical axes of the part of the detection components are in the same horizontal plane. The optical axes of the other part of the detection components 20 are perpendicular to the surface of the to-be-detected object.

For example, when each of the detection components 20 includes a camera 21, the optical axes of lenses of a part of the cameras 21 are parallel to the surface of the to-be-detected object, and the optical axes of the part of the cameras 21 are in the same horizontal plane. The optical axes of lenses of the other part of the cameras 21 are perpendicular to the surface of the to-be-detected object. That is, the cameras 21 are arranged such that the optical axes of the part of the cameras 21 are perpendicular to the optical axes of the other part of cameras. That is, the optical axes of the part of the cameras 21 are arranged horizontally, and the optical axes of the other part of the cameras 21 are arranged vertically, so as to realize a flexible arrangement of a device.

For clear imaging, the detection device may further include an autofocus module 40. The autofocus module 40 may include one or both of a WDI module and a spectral confocal module. A specific structure and working principle of the WDI module and the spectral confocal module are well-known according to the conventional technology, which is not repeated herein.

In the embodiments, the optical path assembly 10 may further be provided with at least one diaphragm, a beam splitter 13 and an objective lens 14. The detection component includes a zoom camera. The zoom camera may include a camera 21, a zoom motor 22 and an imaging zoom lens barrel 23. The zoom motor 22 is configured to drive the imaging zoom lens barrel 23 to move along an axial direction of the imaging zoom lens barrel to realize zooming of the camera 21, so as to improve imaging resolution of the camera 21. The camera 21 may be further supported and fixed by a camera fixing frame 24.

The beam splitter 13 includes a horizontal optical axis and a vertical optical axis, one of which is coaxial with the optical axis of the zoom camera, and the other is coaxial with the optical axis of the light incident end 11 of the optical path assembly 10. The optical axis of the light incident end 11 shown in FIG. 4 is perpendicular to the to-be-detected surface of the wafer. The diaphragm and the beam splitter 13 may be arranged reasonably such that the optical axis of the light incident end 11 is parallel to the to-be-detected surface of the wafer, that is, an incident light through the light incident end 11 is horizontal.

The objective lens 14 of the optical path assembly 10 has an aperture size in a range from 10 mm to 150 mm, and the objective lens 14 has a numerical aperture in a range from 0.1 to 0.95. In addition, each of the detection devices may further include a low-power imaging assembly. The low-power imaging assembly 60 has a field of view located in a center of the field of view of the detective device. The low-power imaging assembly 60 is configured to position a detected area of the surface of the to-be-detected object. The magnification factor of the low-power imaging assembly 60 is smaller than that of the detection unit. The low-power imaging assembly 60 further includes an optical path assembly connected with the light source and a detection component, where the optical path assembly of the low-power imaging assembly 60 has the same function as the optical path assembly of the detection unit, except that the lens of the optical path assembly of the low-power imaging assembly 60 is a low-power lens with a magnification factor of 1 time to 10 times, which can obtain a larger viewing. Similarly, the detection component of the low-power imaging assembly 60 has the same function as the detection component of the detection unit, and the structure thereof may be the same or different.

The low-power imaging component is provided to observe the surface of the to-be-detected object from a macroscopic level, in order to realize functions such as defect positioning.

The detection device, the detection apparatus and a detection method according to the present disclosure have been described in detail above. The principles and implementations of the present disclosure are described herein by using specific examples, and the descriptions of the above embodiments are only used to help understanding the method and core ideas of the present disclosure. It should be noted that for those skilled in the art, various improvements and modifications may be made to the present disclosure without departing from the principle of the present disclosure, and these improvements and modifications shall fall within the protection scope of the claims of the present disclosure.

The invention claimed is:

1. A detection device, comprising:
a detection assembly comprising at least two rows of optical detection devices, wherein the row of the optical detection devices are arranged along a first direction in a field of view on a surface of a to-be-detected object, and each row of optical detection devices comprises at least two optical detection devices, the optical detection devices in one row are arranged along a second direction in the field of view on the surface of the to-be-detected object, and each of the optical detection devices is configured to detect the to-be-detected object, where the second direction is perpendicular to the first direction; and
a driving assembly configured to drive the to-be-detected object to move along at least one of the first direction and the second direction, or drive the detection assembly as a whole to move along at least one of the first direction and the second direction,
wherein the driving assembly comprises a first driving component configured to drive the to-be-detected object to move along the first direction and the second direction with respect to the optical detection devices, wherein
the first driving component, during operation, drives the to-be-detected object to reciprocate along the first direction, wherein a travel distance of one way in reciprocating is greater than or equal to one row spacing, and the row spacing indicates a distance between adjacent rows; and
every time before the to-be-detected object is driven to change direction, the first driving component drives the to-be-detected object to move along the second direction with a predetermined distance, where the predetermined distance is greater than or equal to an interval between adjacent optical detection devices along the second direction.

2. The detection device according to claim 1, wherein each of the optical detection devices comprises an optical path assembly and a detection component, wherein
the optical path assembly is configured to direct light emitted from a light source to a detection area on the surface of the to-be-detected object, and direct signal light formed by the detection area to the detection component;
the detection component is configured to detect the detection area based on the signal light; and
in a detection process, scanning ranges of the optical detection devices are at least partially non-overlapping.

3. The detection device according to claim 2, wherein light exit ports of optical path components of the optical detection device are arranged on a same side of the surface of the to-be-detected object, and are arranged in a plurality of rows along the first direction, wherein each of the rows comprises at least two light exit ports arranged at an interval, and the signal light reflected by the detection area passes through light exit ports and enters the detection component.

4. The detection device according to claim 2, wherein fields of view of optical path assemblies in adjacent rows are spaced by a same distance of L/N, and a number of the fields of view in each of the rows is M, and the fields of view of optical path assemblies in one row are spaced by a distance of S/M,
wherein L represents a maximum dimension of the surface of the to-be-detected object along the first direction, and S represents a maximum dimension of the surface of the to-be-detected object along the second direction, and N is a natural number representing a number of the rows.

5. The detection device according to claim 2, wherein each of the detection components comprises a tube lens and a detector, wherein the tube lens is configured to direct the signal light to the detector; and
wherein optical axes of the detection components are parallel to the surface of the to-be-detected object, and the optical axes of the detection components are in a same horizontal plane; and/or
optical axes of a part of the detection components are parallel to the surface of the to-be-detected object and the optical axes of the part of the detection components are in a same horizontal plane, and optical axis of other part of the detection components are perpendicular to the surface of the to-be-detected object.

6. The detection device according to claim 2, wherein each of the optical path assemblies is connected to the light source through an optical fiber, wherein
an optical axis of the optical path assembly is perpendicular to the surface of the to-be-detected object;
the optical path assembly comprises: a beam splitter and an objective lens, wherein the beam splitter is configured to transmit light emitted from the light source to the objective lens, and the objective lens is configured to collect the signal light returned by the surface of the to-be-detected object, and transmit the signal light to the beam splitter, wherein the beam splitter is further configured to reflect the signal light collected by the objective lens to the detection component.

7. The detection device according to claim 6, wherein the optical path component further comprises:
a collimating assembly connected with the light source, wherein the collimating assembly is configured to collimate the light emitted from the light source, and the light collimated by the collimating assembly is received by the beam splitter; and
a filter assembly arranged on an optical path between the light source and the objective lens, wherein the filter assembly comprises one or more diaphragms.

8. The detection device according to claim 2, wherein each of the optical path assemblies is connected to the light source through an optical fiber, and comprises a beam splitter and an objective lens, wherein
an optical axis of the optical path assembly between the light source and the beam splitter is parallel to the surface of the to-be-detected object;
the beam splitter is configured to reflect the light emitted from the light source to the objective lens, and
the objective lens is configured to collect the signal light returned from the surface of the to-be-detected object, and transmit the signal light to the beam splitter,
the detection component comprises a first detection component and a second detection component,
the second detection component has an optical axis perpendicular to the surface of the to-be-detected object, and the first detection component includes a reflector,
the beam splitter is further configured to transmit the signal light collected by the objective lens to the second detection component, or to transmit the signal light collected by the objective lens to the reflector, and the reflector is configured to reflect the signal light transmitted through the beam splitter to rotate a propagation direction of the signal light by 90° and direct the reflected signal light to the first detection component.

9. The detection device according to claim 8, wherein the field of view of the first detection component is spaced from the field of view of the second detection component.

10. The detection device according to claim 6, wherein the device further comprises an autofocus module fixedly arranged on each of the detection components, wherein the autofocus module is configured to operate to make the optical detection device focus on the to-be-detected object, and the autofocus module comprises one or both of a WDI module and a spectral confocal module; and/or the device further comprises a low-power imaging assembly, wherein an optical axis of a lens of the low-power imaging assembly is arranged at a center of an area enclosed by light exit ports of the optical path assemblies; and/or each of the detection components comprises a camera, a zoom motor, and an imaging zoom lens barrel, wherein the zoom motor is configured to drive the imaging zoom lens barrel to move along an axial direction of the imaging zoom lens barrel to achieve zooming of the camera; and/or each of the optical path assemblies comprises a light incident end connected to an optical fiber, and the optical path assembly is further provided with at least one diaphragm, the beam splitter and the objective lens, wherein the optical axis of the light incident end is perpendicular to the surface of the to-be-detected object or is parallel to the surface of the to-be-detected object.

11. The detection device according to claim 6, wherein the objective lens of the optical path assembly has an aperture size in a range from 10 mm to 150 mm, and the objective lens has a numerical aperture in a range from 0.1 to 0.95.

12. The detection device according to claim 1, further comprising: a rack, wherein the optical detection devices are integrated on the rack.

13. A detection method, comprising:

arranging at least two rows of optical detection devices in advance, wherein the rows of optical detection devices are arranged along a first direction in a field of view on a surface of a to-be-detected object, the optical detection devices in one row are arranged along a second direction in the field of view on the surface of the to-be-detected object, each row of optical detection devices comprises at least two optical detection devices, and the second direction is perpendicular to the first direction; and driving the to-be-detected object to move along at least one of the first direction and the second direction, or driving the optical detection devices as a whole to move along at least one of the first direction and the second direction, to detect the surface of the to-be-detected object, wherein the driving the to-be-detected object comprises:

driving the surface of the to-be-detected object to move along the first direction and the second direction with respect to the optical detection devices;

driving, during operation, the to-be-detected object to reciprocate along the first direction, wherein a travel distance of one way in reciprocating is greater than or equal to one row spacing, and the row spacing indicates a distance between adjacent rows; and driving, every time before the to-be-detected object is driven to change direction, the to-be-detected object to move along the second direction with a predetermined distance, wherein the predetermined distance is greater than or equal to an interval between adjacent optical detection devices along the second direction.

* * * * *